United States Patent
Zhu et al.

(10) Patent No.: US 10,432,319 B2
(45) Date of Patent: Oct. 1, 2019

(54) RECEIVERS WITH AUTOMATIC GAIN CONTROL

(71) Applicant: Hewlett Packard Enterprise Development LP, Houston, TX (US)

(72) Inventors: Kehan Zhu, Palo Alto, CA (US); Cheng Li, Palo Alto, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/768,975

(22) PCT Filed: Oct. 29, 2015

(86) PCT No.: PCT/US2015/058044
§ 371 (c)(1),
(2) Date: Apr. 17, 2018

(87) PCT Pub. No.: WO2017/074385
PCT Pub. Date: May 4, 2017

(65) Prior Publication Data
US 2019/0068292 A1    Feb. 28, 2019

(51) Int. Cl.
*H04B 10/00* (2013.01)
*H04B 10/69* (2013.01)
(Continued)

(52) U.S. Cl.
CPC ......... *H04B 10/6931* (2013.01); *H04B 10/25* (2013.01); *H04B 10/2507* (2013.01); *H04B 10/693* (2013.01); *H04L 25/4917* (2013.01)

(58) Field of Classification Search
CPC ........ H04B 10/69; H04B 10/697; H03G 3/20; H03G 3/30; H03G 3/301
See application file for complete search history.

(56) References Cited

U.S. PATENT DOCUMENTS 7,123,098 B2 * 10/2006 Bae .......................... H03F 3/08
330/308
7,423,487 B2   9/2008 Fornasari et al.
(Continued)

FOREIGN PATENT DOCUMENTS

JP    05239868        7/2013
JP    5239868 B2      7/2013

OTHER PUBLICATIONS

Shanmugasundaram H., "CMOS Optical Transimpedance Amplifier Design for PAM Signaling Application," (Research Paper), Dec. 2005, 122 pages.
(Continued)

*Primary Examiner* — Daniel G Dobson
(74) *Attorney, Agent, or Firm* — Hewlett Packard Enterprise Patent Department

(57) ABSTRACT

One example of a receiver includes a first stage, a second stage, a third stage, and an automatic gain controller. The first stage amplifies an input signal to provide a first signal. The second stage amplifies or attenuates the first signal to provide a second signal based on a tunable gain of the second stage. The tunable gain is adjusted in response to a differential signal. The third stage amplifies the second signal to provide an output signal. The automatic gain controller provides the differential signal based on a comparison between a peak voltage of the output signal and the sum of a common mode voltage of the output signal and an offset voltage.

15 Claims, 5 Drawing Sheets

(51) Int. Cl.
  *H04B 10/2507* (2013.01)
  *H04B 10/25* (2013.01)
  *H04L 25/49* (2006.01)
  *H04J 14/00* (2006.01)

(56) References Cited

U.S. PATENT DOCUMENTS

| | | |
|---|---|---|
| 7,605,660 B1 | 10/2009 | Kobayashi |
| 8,971,717 B1 | 3/2015 | Joffe |
| 2003/0214353 A1* | 11/2003 | Yoon .................. H03F 3/082 330/69 |
| 2010/0046965 A1 | 2/2010 | Shioiri et al. |
| 2010/0073083 A1 | 3/2010 | Sutardja |
| 2010/0283543 A1 | 11/2010 | Shivaram et al. |
| 2014/0306760 A1 | 10/2014 | Piepenstock et al. |
| 2014/0320207 A1 | 10/2014 | Huang et al. |
| 2014/0334832 A1 | 11/2014 | Guckenberger |
| 2018/0234096 A1* | 8/2018 | Li ..................... H03K 17/78 |
| 2018/0254756 A1* | 9/2018 | Murphy ................ H03F 3/08 |

OTHER PUBLICATIONS

International Search Report and Written Opinion received for PCT Patent Application No. PCT/US2015/058044, dated Jul. 26, 2016, 8 pages.

\* cited by examiner

RECEIVERS WITH AUTOMATIC GAIN CONTROL

STATEMENT OF UNITED STATES GOVERNMENT INTEREST

This invention was made with United States government support under Contract No. H98230-14-3-0011. The United States government has certain rights in the invention.

BACKGROUND

Data center networks may use fiber optics to communicate data between devices, such as servers and switches. An optical transmitter is used to convert an electrical signal to an optical signal for transmission through a fiber optic cable. An optical receiver is used to convert a received optical signal back into an electrical signal.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Four-level pulse-amplitude modulation (PAM-4) is one of the enablers for next generation high-speed data center networking. Compared to non-return-to-zero (NRZ) modulation, the signal-to-noise ratio (SNR) of PAM-4 is intrinsically at least 9 dB less than the SNR of NRZ with the same amplitude. When receiving an optical PAM-4 signal, the gain of the transimpedance amplifier (TIA) used to convert the optical PAM-4 signal into an electrical PAM-4 signal should be automatically adjusted to accommodate different optical power levels of the PAM-4 signal. If the different optical power levels of the PAM-4 signal are not accommodated, the output PAM-4 signal will have amplitude distortion as may be observed from an eye diagram of the output PAM-4 signal.

In addition, a variable gain control method used in an NRZ TIA in which a metal-oxide-semiconductor field-effect transistor (MOSFET) is used as a variable resistor will result in level dependent rise-time and fall-time effect during level transitions when processing a PAM-4 signal. Therefore, as may be observed from an eye diagram of the output PAM-4 signal, the output PAM-4 signal will have a time skew effect due to the MOSFET nonlinearity at large signal swing. This time skew will result in timing issues for slicer circuits following the TIA at higher speeds (e.g., 32 GBd).

Accordingly, the following description describes examples of an optical receiver (e.g., a TIA) for receiving a PAM-4 optical signal. The TIA includes an automatic gain control circuit to ensure proper functioning of the TIA for a wide dynamic range of optical intensity, while maintaining a constant amplitude, distortion-free and time skew-free PAM-4 electrical output signal. The TIA includes three amplification stages in which the second stage includes a tunable gain. The gain of the second stage is controlled by the output of a fully differential comparator, which compares a peak voltage of the output signal to a sum of a common mode voltage of the output signal and an offset voltage.

Figure 1:
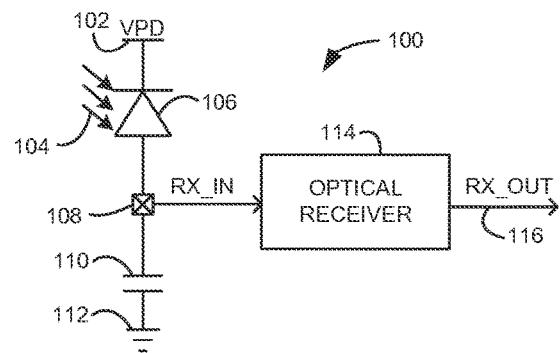
FIG. 1 is a schematic diagram illustrating one example of a system.

FIG. 1 is a schematic diagram illustrating one example of a system 100. System 100 includes an optical detector 106, a parasitic capacitance as indicated by capacitor 110, and an optical receiver 114. In one example, optical detector 106 is a photodiode or other suitable photodetector. The cathode of optical detector 106 is electrically coupled to a supply voltage (VPD) 102. The anode of optical detector 106 is electrically coupled to the input of optical receiver 114 and one terminal of capacitor 110 through a node 108. The other terminal of capacitor 110 is electrically coupled to a common or ground 112. The output of optical receiver 114 is electrically coupled to a node 116.

Optical detector 106 receives an optical signal as indicated at 104. In one example, optical signal 104 is a PAM-4 optical signal. Optical detector 106 converts optical signal 104 to a current signal to provide a receiver input signal (RX_IN) on node 108. Optical receiver 114 is a transimpedance amplifier that converts the current signal RX_IN on node 108 to a voltage signal to provide a receiver output signal (RX_OUT) on node 116. Due to the configuration of optical receiver 114, RX_OUT has no amplitude distortion and no time skew for a wide dynamic range of RX_IN.

Figure 2:
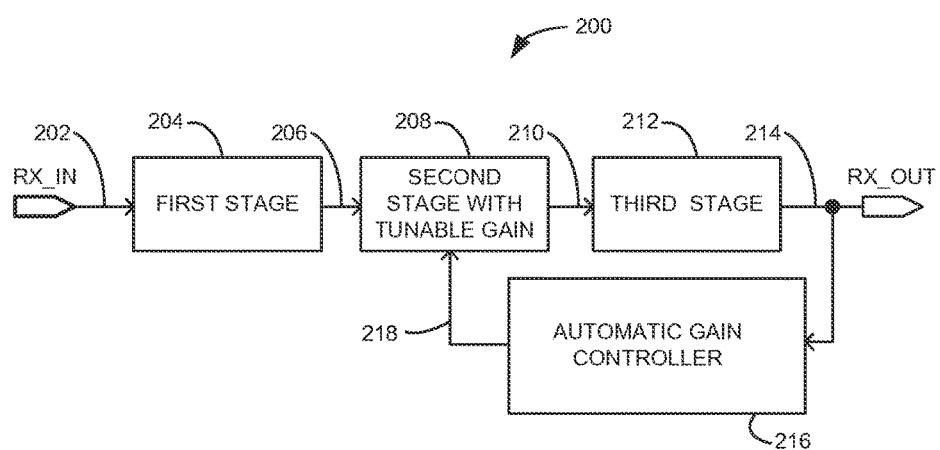
FIG. 2 is a block diagram illustrating one example of an optical receiver.

FIG. 2 is a block diagram illustrating one example of an optical receiver 200. In one example, optical receiver 200 provides optical receiver 114 previously described and illustrated with reference to FIG. 1. Optical receiver 200 includes a first stage 204, a second stage 208, a third stage 212, and an automatic gain controller 216. The input of first stage 204 receives the input signal RX_IN through a signal path 202. The output of first stage 204 is electrically coupled to a first input of second stage 208 through a signal path 206. The output of second stage 208 is electrically coupled to the input of third stage 212 through a signal path 210. The output of third stage 212 is electrically coupled to the input of automatic gain controller 216 and provides the output signal RX_OUT through a signal path 214. The output of automatic gain controller 216 is electrically coupled to a second input of second stage 208 through a signal path 218.

First stage 204 is a transimpedance amplifier stage. First stage 204 receives the input signal RX_IN, which is a current signal, and amplifies RX_IN to provide an amplified voltage signal (i.e., a first signal) on signal path 206. In one example, the gain of first stage 204 is greater than the gain of second stage 208 and the gain of third stage 212 to improve the noise performance of optical receiver 200.

Second stage 208 is an isolating stage and includes a tunable gain. Second stage 208 receives the first signal on signal path 206 and amplifies or attenuates the first signal to provide a second signal on signal path 210. Third stage 212 receives the second signal on signal path 210 and amplifies the second signal to provide the output signal RX_OUT on signal path 214. Automatic gain controller 216 receives RX_OUT on signal path 214 to provide a differential signal on signal path 218 for adjusting the gain of second stage 208. Automatic gain controller 216 provides the differential signal based on a comparison between a sensed peak voltage of RX_OUT and the sum of a common mode voltage of RX_OUT and an offset voltage. The offset voltage is a predefined voltage that may be selected to set the amplitude of RX_OUT.

In response to the peak voltage of RX_OUT being greater than the sum of the common mode voltage of RX_OUT and the offset voltage, automatic gain controller 216 adjusts the gain of second stage 208 such that second stage 208 attenuates of the first signal to provide the second signal. In response to the peak voltage of RX_OUT being less than the sum of the common mode voltage of RX_OUT and the offset voltage, automatic gain controller 216 adjusts the gain of second stage 208 such that second stage 208 amplifies the first signal to provide the second signal.

Figure 3:
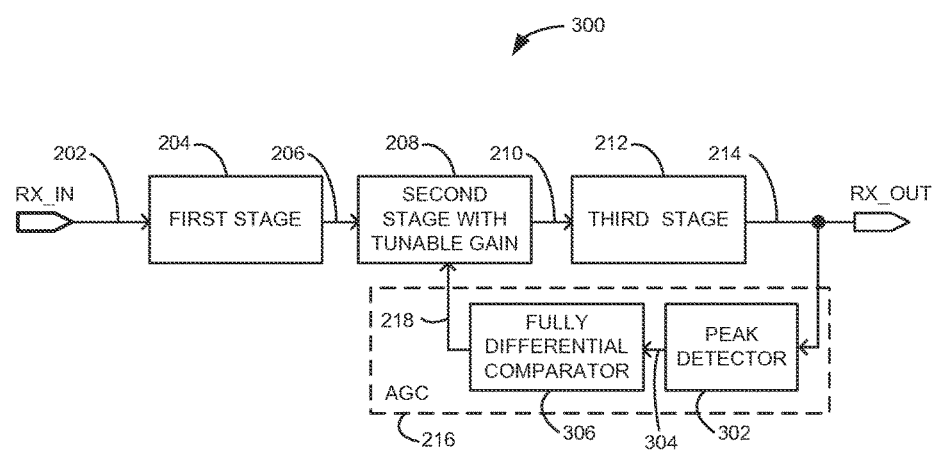
FIG. 3 is a block diagram illustrating another example of an optical receiver.

FIG. 3 is a block diagram illustrating another example of an optical receiver 300. Optical receiver 300 is similar to optical receiver 200 previously described and illustrated with reference to FIG. 2, except that automatic gain controller 216 includes a peak detector 302 and a fully differential comparator 306. The input of peak detector 302 receives the output signal RX_OUT through signal path 214. The output of peak detector 302 is electrically coupled to the input of fully differential comparator 306 through a signal path 304. The output of fully differential comparator 306 is electrically coupled to the second input of second stage 208 through signal path 218.

Peak detector 302 senses the peak voltage of RX_OUT, senses the common mode voltage of RX_OUT, and provides the offset voltage. Peak detector 302 also sums the sensed common mode voltage of RX_OUT and the offset voltage. Fully differential comparator 306 compares the sensed peak voltage of RX_OUT with the sum of the common mode voltage of RX_OUT and the offset voltage to provide the differential signal on signal path 218.

Figure 4:
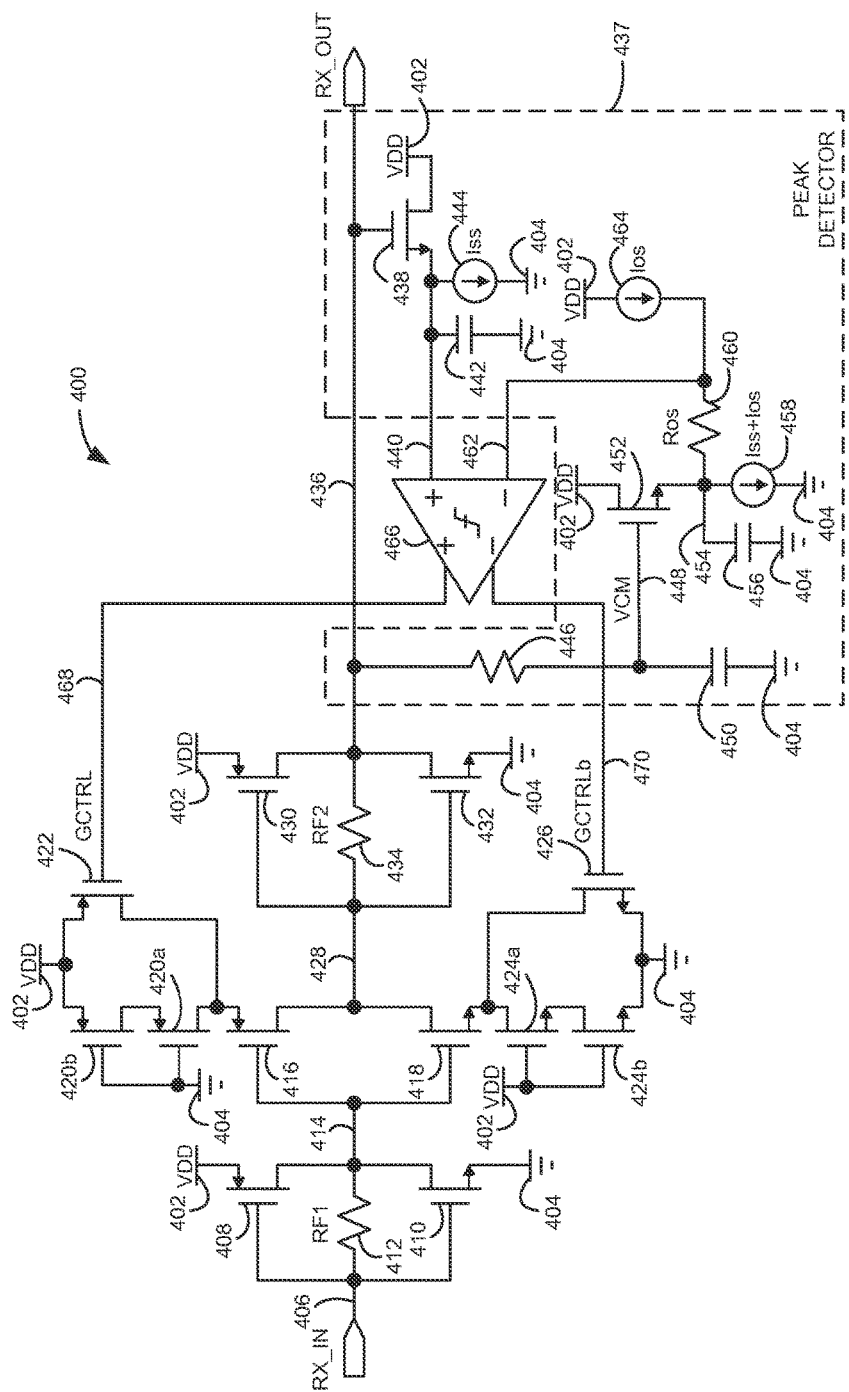
FIG. 4 is a schematic diagram illustrating one example of an optical receiver.

FIG. 4 is a schematic diagram illustrating one example of an optical receiver 400. In one example, optical receiver 400 provides optical receiver 300 previously described and illustrated with reference to FIG. 3. Optical receiver 400 includes a first stage, a second stage, a third stage, a peak detector 437, and a fully differential comparator 466.

The first stage of optical receiver 400 includes transistors 408 and 410 and a resistor 412. In one example, transistor 408 is a p-channel MOSFET and transistor 410 is an n-channel MOSFET. The gates of transistors 408 and 410 and one terminal of resistor 412 are electrically coupled to a node 406. The source of transistor 408 is electrically coupled to a supply voltage (VDD) 402. The drain of transistor 408 is electrically coupled to the other terminal of resistor 412 and the drain of transistor 410 through a node 414. The source of transistor 410 is electrically coupled to a common or ground 404.

The second stage of optical receiver 400 includes transistors 416, 418, 420a and 420b, 422, 424a and 424b, and 426. In one example, transistors 416, 420a and 420b, and 422 are p-channel MOSFETs and transistors 418, 424a and 424b, and 426 are n-channel MOSFETs. In this example, transistors 420a and 420b are a stacked device providing a two finger transistor generally described herein as transistor 420. Transistors 424a and 424b are a stacked device providing a two finger transistor generally described herein as transistor 424. In other examples, transistors 420 and 424 may have another suitable number of fingers. The number of fingers of each transistor 420 and 424 and/or the length of each transistor 420 and 424 may be selected to set the effective resistance of each transistor 420 and 424 and thus leave a sufficient resistor tuning range for transistors 422 and 426 as well as maintain the bandwidth of the second stage.

Transistors 416 and 418 are arranged in an inverter configuration. The gates of transistors 416 and 418 are electrically coupled to node 414. The drain of transistor 416 and the drain of transistor 418 are electrically coupled to a node 428. Transistor 422 is electrically coupled in parallel with transistors 420a and 420b. The gates of transistors 420a and 420b are electrically coupled to common or ground 404. The gate of transistor 422 is electrically coupled to a node 468. The source of transistor 420b and the source of transistor 422 are electrically coupled to supply voltage 402. The drain of transistor 420b is electrically coupled to the source of transistor 420a. The drain of transistor 420a is electrically coupled to the source of transistor 416 and the drain of transistor 422.

Transistor 426 is electrically coupled in parallel with transistors 424a and 424b. The gates of transistors 424a and 424b are electrically coupled to supply voltage 402. The gate of transistor 426 is electrically coupled to a node 470. The source of transistor 424b and the source of transistor 426 are electrically coupled to common or ground 404. The drain of transistor 424b is electrically coupled to the source of transistor 424a. The drain of transistor 424a is electrically coupled to the source of transistor 418 and the drain of transistor 426.

The third stage of optical receiver 400 includes transistors 430 and 432 and a resistor 434. In one example, transistor 430 is a p-channel MOSFET and transistor 432 is an n-channel MOSFET. The gates of transistors 430 and 432 and one terminal of resistor 434 are electrically coupled to node 428. The source of transistor 430 is electrically coupled to supply voltage 402. The drain of transistor 430 is electrically coupled to the other terminal of resistor 434 and the drain of transistor 432 through a node 436. The source of transistor 432 is electrically coupled to common or ground 404.

Peak detector 437 includes transistors 438 and 452, capacitors 442, 450, and 456, current sources 444, 464, and 458, and resistors 446 and 460. In one example, transistors 438 and 452 are n-channel MOSFETs. The current (Iss+Ios) of current source 458 is equal to the sum of the current (Iss) of current source 444 and the current (Ios) of current source 464. The gate of transistor 438 is electrically coupled to node 436. The drain of transistor 438 is electrically coupled to supply voltage 402. The source of transistor 438 is electrically coupled to the non-inverting input of fully differential comparator 466, one terminal of capacitor 442, and one terminal of current source 444 through node 440. The other terminal of current source 444 and the other terminal of capacitor 442 are electrically coupled to common or ground 404.

One terminal of current source 464 is electrically coupled to supply voltage 402. The other terminal of current source 464 is electrically coupled to the inverting input of fully differential comparator 466 and one terminal of resistor 460 through a node 462. The non-inverting output of fully differential comparator 466 is electrically coupled to node 468. The inverting output of fully differential comparator 466 is electrically coupled to node 470. The other terminal of resistor 460 is electrically coupled to one terminal of current source 458, one terminal of capacitor 456, and the source of transistor 452 through a node 454. The other terminal of capacitor 456 and the other terminal of current source 458 are electrically coupled to common or ground 404. The drain of transistor 452 is electrically coupled to supply voltage 402. The gate of transistor 452 is electrically coupled to one terminal of capacitor 450 and one terminal of resistor 446 through a node 448. The other terminal of capacitor 450 is electrically coupled to common or ground 404. The other terminal of resistor 446 is electrically coupled to node 436.

The first stage of optical receiver 400 including transistors 408 and 410 and resistor 412 receives the input signal RX_IN on node 406 to provide a first signal on node 414. The gain of the first stage is set by the resistance (RF1) of resistor 412. The first stage is a transimpedance amplifier stage that converts RX_IN, which is a current signal, to a voltage signal to provide the first signal on node 414.

The second stage of optical receiver 400 is an isolating stage with a tunable gain. The second stage receives the first signal on node 414 to provide a second signal on node 428. The gain of the second stage is controlled by the differential gain control signal (GCTRL and GCTRLb) on nodes 468 and 470, respectively. Transistors 420 and 424 are always on. With transistors 422 and 426 in the linear region due to GCTRL and GCTRLb, respectively, transistors 422 and 426 act as variable resistors and the second stage amplifies or attenuates the first signal on node 414 to provide the second signal on node 428. As GCTRL increases and GCTRLb decreases, the attenuation of the second stage increases.

The effective transconductance ($G_m$) of the second stage is given by:

$$G_m(V_c) = \frac{g_m}{1 + g_m(R_{stack} \| R_C(V_C))}$$

where:
$g_m$ is the transconductance of inverting transistors 416 and 418;
$R_{stack}$ is the effective resistance of stacked transistors 420 and 424; and
$R_c(V_c)$ is the voltage controlled resistor provided by transistors 422 and 426.

The third stage of optical receiver 400 including transistors 430 and 432 and resistor 434 receives the second signal on node 428 to provide the output signal RX_OUT on node 436. The gain of the third stage is set by the resistance (RF2) of resistor 434 and the transconductance of transistors 430 and 432.

Peak detector 437 senses the peak voltage of RX_OUT, senses the common mode voltage of RX_OUT, and sets the offset voltage. The peak voltage of RX_OUT is sensed by the circuit including transistor 438, current source 444 and capacitor 442. The sensed peak voltage of RX_OUT is provided on node 440 at the non-inverting input of fully differential comparator 466. The common mode voltage of RX_OUT is sensed by the circuit including resistor 446 and capacitor 450. Resistor 446 and 450 form a low pass filter such that the common mode voltage (VCM) of RX_OUT is provided on node 448. VCM (minus the threshold voltage of transistor 452) is provided on node 454. The offset voltage is set by the current (Ios) of current source 464 and the resistance (Ros) of resistor 460. The common mode voltage and the offset voltage are summed on node 462 at the inverting input of fully differential comparator 466.

Fully differential comparator 466 receives the sensed peak voltage at the non-inverting input on node 440 and the sum of the common mode voltage and the offset voltage at the inverting input on node 462. Fully differential comparator 466 compares the sensed peak voltage to the sum of the common mode voltage and the offset voltage to provide the differential signal including GCTRL on node 468 and GCTRLb on node 470. In response to the sensed peak voltage being less than the sum of the common mode voltage and the offset voltage, fully differential comparator 466 outputs GCTRL and GCTRLb such that transistors 422 and 426 are turned on more, respectively, and the second stage amplifies the first signal to provide the second signal. In response to the sensed peak voltage being greater than the sum of the common mode voltage and the offset voltage, fully differential comparator 466 outputs GCTRL and GCTRLb such that transistors 422 and 426 are turned on less, respectively, and the second stage attenuates the first signal to provide the second signal.

Figure 5:
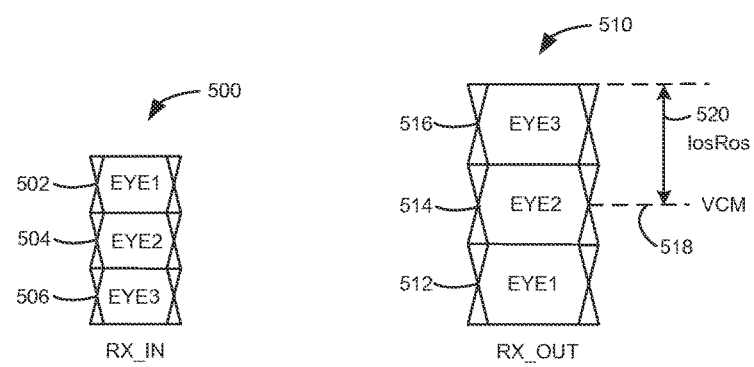
FIG. 5 illustrates one example of an eye diagram for an input signal and an eye diagram for an output signal.

FIG. 5 illustrates one example of an eye diagram 500 for RX_IN and an eye diagram 510 for RX_OUT for optical receiver 400 previously described and illustrated with reference to FIG. 4. In this example, RX_IN is a PAM-4 signal and thus eye diagram 500 includes a first eye 502, a second eye 504, and a third eye 506. Second eye 504 is above third eye 506, and first eye 502 is above second eye 504. Eye diagram 510 of RX_OUT includes a first eye 512, a second eye 514, and a third eye 516 corresponding to first eye 502, second eye 504, and third eye 506 of eye diagram 500, respectively. Second eye 514 is above first eye 512, and third eye 516 is above second eye 514. As illustrated by eye diagram 500 and eye diagram 510, RX_IN is inverted by optical receiver 400 to provide RX_OUT. The common mode voltage (VCM) of eye diagram 510 is indicated at 518 and the offset voltage (IosRos) of eye diagram 510 is indicated at 520. Accordingly, the amplitude of RX_OUT may be adjusted by adjusting the offset voltage.

Figure 6:
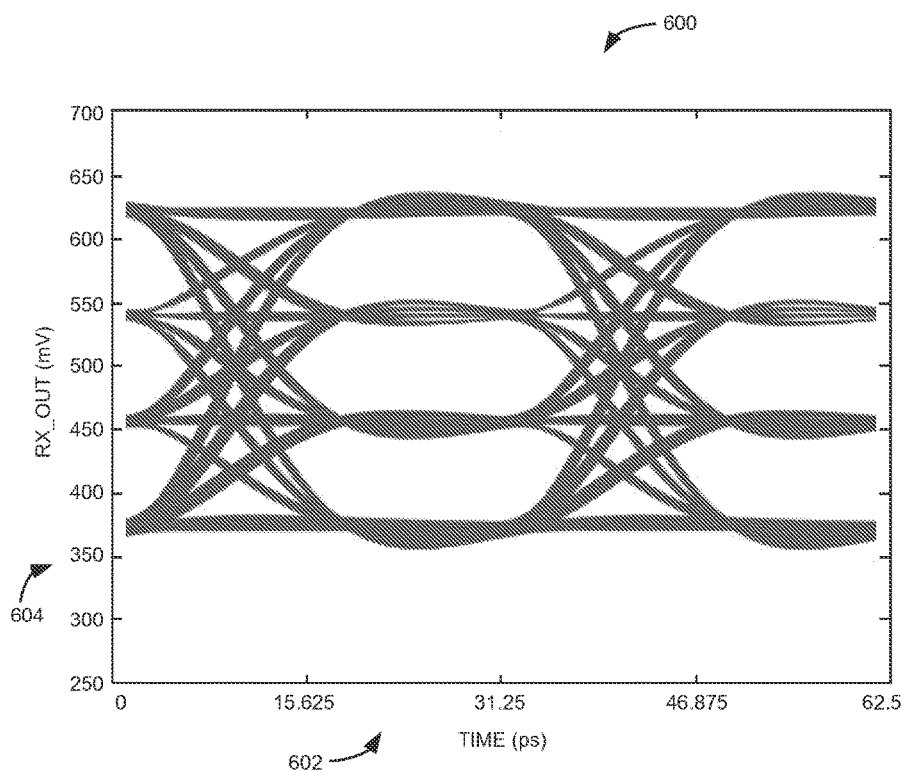
FIG. 6 illustrates one example of a PAM-4 eye diagram for an output signal at a 32 GBd rate.

FIG. 6 illustrates one example of a PAM-4 eye diagram 600 for RX_OUT at a 32 GBd rate for optical receiver 400 previously described and illustrated with reference to FIG. 4. Eye diagram 600 indicates time in picoseconds on x-axis 602 and RX_OUT in millivolts on y-axis 604. As illustrated by eye diagram 600, RX_OUT has no amplitude distortion and no time skew when RX_IN is large such that the second stage of optical receiver 400 is attenuating.

Figure 7:
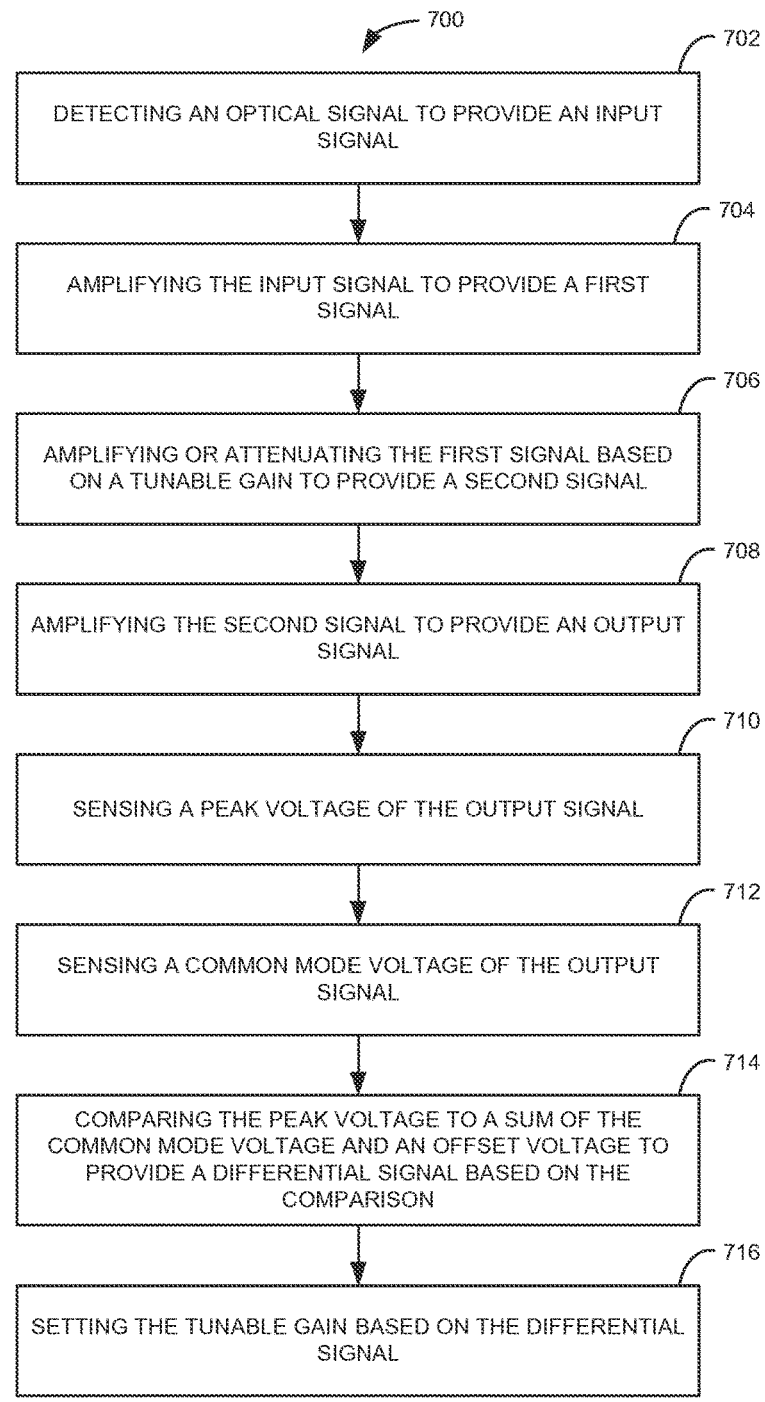
FIG. 7 is a flow diagram illustrating one example of a method for receiving an optical signal.

FIG. 7 is a flow diagram illustrating one example of a method 700 for receiving an optical signal. At 702, method 700 includes detecting an optical signal to provide an input signal. In one example, detecting the optical signal comprises detecting a PAM-4 optical signal. At 704, method 700 includes amplifying the input signal to provide a first signal. At 706, method 700 includes amplifying or attenuating the first signal based on a tunable gain to provide a second signal. At 708, method 700 includes amplifying the second signal to provide an output signal. At 710, method 700 includes sensing a peak voltage of the output signal. At 712, method 700 includes sensing a common mode voltage of the output signal.

At 714, method 700 includes comparing the peak voltage to a sum of the common mode voltage and an offset voltage to provide a differential signal based on the comparison. At 716, method 700 includes setting the tunable gain based on the differential signal. In one example, amplifying or attenuating the first signal comprises attenuating the first signal in response to the peak voltage being greater than the sum of the common mode voltage and the offset voltage such that the output signal is free of amplitude distortion and time skew. In one example, setting the tunable gain comprises adjusting a first transistor in the linear region as a variable resistor and a second transistor in the linear region as a variable resistor based on the differential signal, respectively. In another example, amplifying or attenuating the first signal comprises amplifying the first signal in response to the peak voltage being less than the sum of the common mode voltage and the offset voltage.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A receiver comprising:
a first stage to amplify an input signal to provide a first signal;
a second stage to amplify or attenuate the first signal to provide a second signal based on a tunable gain of the second stage, the tunable gain adjusted in response to a differential signal;
a third stage to amplify the second signal to provide an output signal; and
an automatic gain controller to provide the differential signal based on a comparison between a peak voltage of the output signal and the sum of a common mode voltage of the output signal and an offset voltage.

2. The receiver of claim 1, wherein the automatic gain controller comprises:
a peak detector to sense the peak voltage of the output signal, sense the common mode voltage of the output signal, and provide the offset voltage; and
a fully differential comparator to compare the sensed peak voltage of the output signal with the sum of the common mode voltage of the output signal and the offset voltage to provide the differential signal.

3. The receiver of claim 1, wherein the second stage comprises an always on first transistor in parallel with a second transistor and an always on third transistor in parallel with a fourth transistor, the second transistor and the fourth transistor controlled by the differential signal, respectively, to adjust the gain of the second stage.

4. The receiver of claim 1, further comprising:
an optical detector to detect an optical signal to provide the input signal.

5. The receiver of claim 4, wherein the optical signal comprises a PAM-4 signal.

6. A receiver comprising:
a first stage to amplify an input signal to provide a first signal;
a second stage to amplify or attenuate the first signal to provide a second signal based on a tunable gain of the second stage;
a third stage to amplify the second signal to provide an output signal;
a peak detector to sense a peak voltage of the output signal, to sense a common mode voltage of the output signal, and to provide an offset voltage; and
a fully differential comparator to adjust the gain of the second stage based on a comparison between the sensed peak voltage and the sum of the common mode voltage and the offset voltage.

7. The receiver of claim 6, wherein the second stage comprises:
an isolator comprising a first transistor and a second transistor in an inverter configuration;
an always on third transistor electrically coupled in series with a drain-source path of the first transistor;
an always on fourth transistor electrically coupled in series with a drain-source path of the second transistor;
a fifth transistor electrically coupled in parallel with the third transistor, and
a sixth transistor electrically coupled in parallel with the fourth transistor,
wherein the fifth transistor and the sixth transistor are controlled by outputs of the fully differential comparator, respectively.

8. The receiver of claim 7, wherein the third transistor comprises a stacked device to set an effective resistance of the third transistor, and
wherein the fourth transistor comprises a stacked device to set an effective resistance of the fourth transistor.

9. The receiver of claim 6, wherein the input signal comprises a current signal and the first signal comprises a voltage signal.

10. The receiver of claim 6, wherein the input signal comprises a PAM-4 signal.

11. A method for receiving an optical signal, the method comprising:
detecting an optical signal to provide an input signal;
amplifying the input signal to provide a first signal;
amplifying or attenuating the first signal based on a tunable gain to provide a second signal;
amplifying the second signal to provide an output signal;
sensing a peak voltage of the output signal;
sensing a common mode voltage of the output signal;
comparing the peak voltage to a sum of the common mode voltage and an offset voltage to provide a differential signal based on the comparison; and
setting the tunable gain based on the differential signal.

12. The method of claim 11, wherein detecting the optical signal comprises detecting a PAM-4 optical signal.

13. The method of claim 12, wherein amplifying or attenuating the first signal comprises attenuating the first signal in response to the peak voltage being greater than the sum of the common mode voltage and the offset voltage such that the output signal is free of amplitude distortion and time skew.

14. The method of claim 11, wherein setting the tunable gain comprises adjusting a first transistor in the linear region as a variable resistor and a second transistor in the linear region as a variable resistor based on the differential signal, respectively.

15. The method of claim 11, wherein amplifying or attenuating the first signal comprises amplifying the first signal in response to the peak voltage being less than the sum of the common mode voltage and the offset voltage.

* * * * *